C. D. SWANN.
NUT LOCK.
APPLICATION FILED JAN. 3, 1917.
1,292,970.
Patented Jan. 28, 1919.
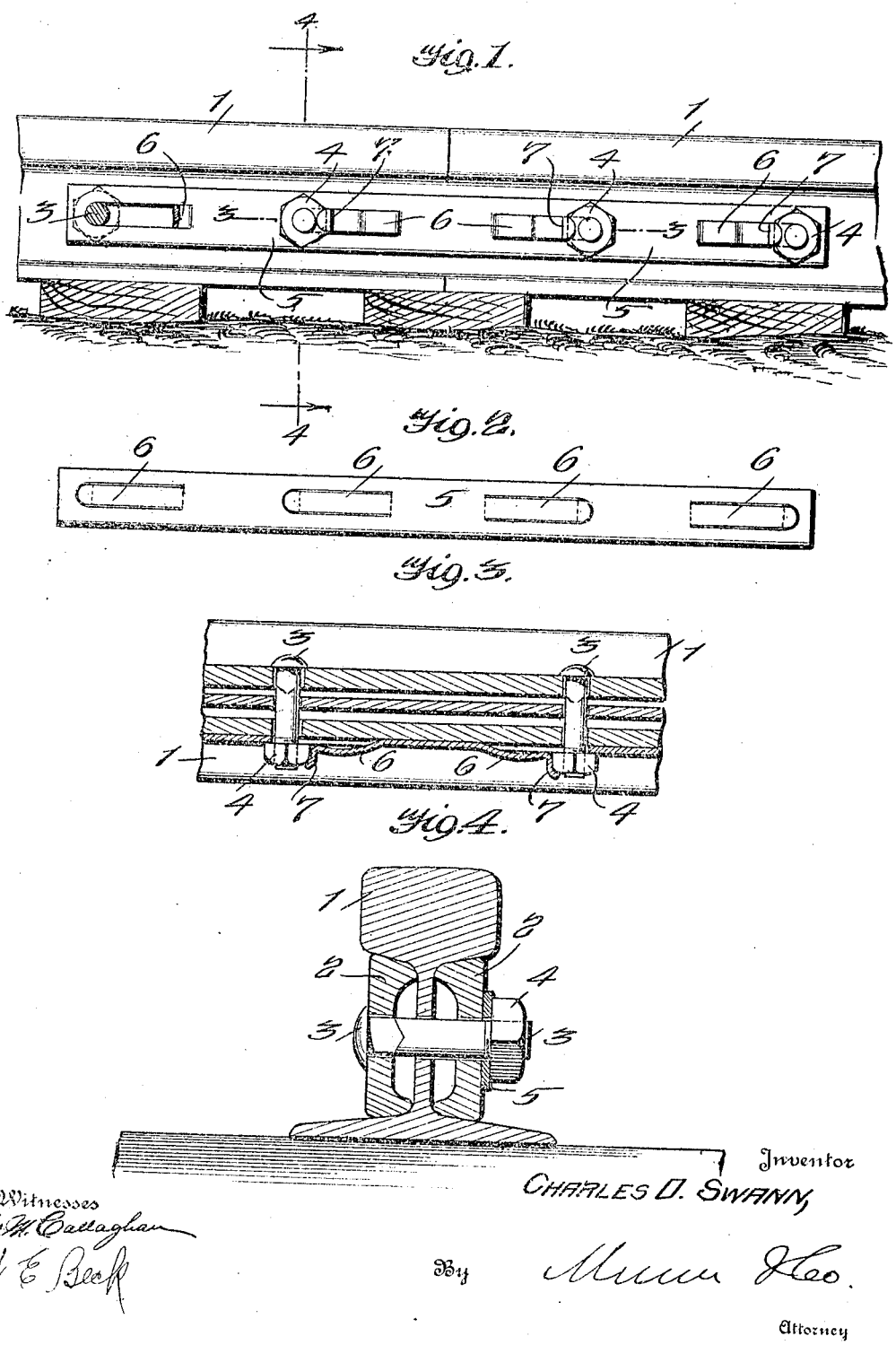
Witnesses
E. M. Callaghan
W. E. Beck
Inventor
CHARLES D. SWANN,
By Munn & Co.
Attorney

UNITED STATES PATENT OFFICE.

CHARLES DEVINNIE SWANN, OF MOGOLLON, NEW MEXICO.

NUT-LOCK.

1,292,970.   Specification of Letters Patent.   Patented Jan. 28, 1919.

Application filed January 3, 1917. Serial No. 140,481.

*To all whom it may concern:*

Be it known that I, CHARLES DEVINNIE SWANN, a citizen of the United States, and a resident of Mogollon, in the county of Socorro and State of New Mexico, have invented a new and useful Improvement in Nut-Locks, of which the following is a specification.

My invention is an improvement in nut locks and has for its object to provide a lock of the character specified, especially adapted for use in rail joints, wherein a plate is provided having openings through which the bolts may pass, and having means in connection therewith for engaging all of the nuts to prevent their being accidentally loosened.

In the drawings:—

Figure 1 is a side view of a rail joint provided with the improved lock,

Fig. 2 is a plan view of the plate in which the lock is formed,

Figs. 3 and 4 are sections on lines 3—3, 4—4, respectively, of Fig. 1, Fig. 4 looking in the direction of the arrows adjacent to the line.

The present embodiment of the invention is shown in connection with a rail joint consisting of the rail ends 1, the fish plates 2, and the bolts 3 which are passed through and registering openings in the fish plates and web of the rail and engaged by the nuts 4.

The improved lock comprises a plate 5 of sheet metal and of suitable length and width, and a series of tongues 6 is formed in the plate, by slitting the material of the plate. These tongues are spaced to correspond with the spacing of the bolts 3, and the detached end of each tongue is formed by a rounding cut as shown, and it is at these points that the bolts are passed.

The free ends of the tongues are bent upwardly in the same direction as indicated at 7 to engage a face of the adjacent nut, and the extremity of each bent up portion is bent to slightly overlie the nut, as shown more particularly in Figs. 1 and 2.

It will be noticed that the tongues 6 are of approximately the same width as the diameter of the bolt and since the tongues are of resilient material they may be bent outwardly to permit the placing or removal of the nuts. After the nuts are in place, the tongues are released and they will, due to their natural resiliency, assume the position of Fig. 3, thus firmly locking the nuts against the possibility of accidental displacement.

The improved lock is a combined washer and nut for each bolt.

I claim:—

A nut lock for rail joints, comprising in combination with the bolts and nuts, of a plate of sheet metal having tongues formed from the material thereof corresponding in number and spacing to the spacing of the bolts of the joints, the slots formed by the cutting of the tongues being adapted to receive the bolts and the slots being arranged to cause the bolts to engage the ends of the slots at the detached ends of the tongues, the free ends of the tongues engaging the nuts.

CHARLES DEVINNIE SWANN.

Witnesses:
   J. E. CULLOM,
   W. A. GOYEN.

Copies of this patent may be obtained for five cents each, by addressing the "Commissioner of Patents, Washington, D. C."